United States Patent [19]
Hwang

[11] Patent Number: 5,373,737
[45] Date of Patent: Dec. 20, 1994

[54] SENSOR DEVICE FOR MASS FLOW CONTROLLER

[75] Inventor: Chang H. Hwang, Seoul, Rep. of Korea

[73] Assignee: Goldstar Electron Co., Ltd., Choongchungbook, Rep. of Korea

[21] Appl. No.: 31,403

[22] Filed: Mar. 15, 1993

[30] Foreign Application Priority Data

Apr. 15, 1992 [KR] Rep. of Korea .................. 6299-1992

[51] Int. Cl.$^5$ .............................................. G01F 1/68
[52] U.S. Cl. ............................ 73/204.22; 73/204.23
[58] Field of Search ........... 73/204.23, 204.24, 204.25, 73/204.27, 204.21, 204.22

[56] References Cited

U.S. PATENT DOCUMENTS

| | | | |
|---|---|---|---|
| 3,326,040 | 6/1967 | Walsh | 73/204.21 |
| 4,440,021 | 4/1984 | Abouchar et al. | 73/204.22 |
| 4,464,932 | 8/1984 | Ewing et al. | 73/204.15 |
| 4,487,213 | 12/1984 | Gates et al. | 73/204.22 |
| 4,672,997 | 6/1987 | Landis et al. | |
| 5,048,332 | 9/1991 | Ishinawa et al. | 73/204.24 |

FOREIGN PATENT DOCUMENTS 1127568 9/1968 United Kingdom ............. 73/204.24

*Primary Examiner*—Herbert Goldstein
*Attorney, Agent, or Firm*—Lowe, Price, LeBlanc & Becker

[57] ABSTRACT

A sensor device for a mass flow controller suitable for stably sensing gas flowrate of the mass flow controller regardless of variation of peripheral temperature. This sensor device comprises a case being covered with a thermal insulation plate, a sensor tube being arranged in the in-suit case to pass therethrough, an up-stream coil and a down-stream coil coiling around the sensor tube and being adapted for sensing heat of a gas passing through the sensor tube, respectively, a thermoelectric converter for converting a heat difference of the gas in the sensor tube into a voltage, an amplifier for amplifying the voltage output from the thermoelectric converter, a linearizer for linearizing the amplified voltage of the amplifier, a refrigeratory plate being arranged in the case for maintaining the inside temperature of the sensor device at a predetermined temperature, a pair of Peltier thermoelectric wires comprising an antimon wire and a bismuth wire being connected to a drive power supply terminal and a ground terminal of an electric power connector, respectively, and a thermostat for selectively cutting off power supply to the refrigeratory plate when the inside temperature of the sensor device is lower or higher than a predetermined critical temperature.

1 Claim, 2 Drawing Sheets

SENSOR DEVICE FOR MASS FLOW CONTROLLER

BACKGROUND OF THE INVENTION

1. Field of the Invention

The present invention relates in general to a mass flow controller for controlling gas flowrate, and more particularly to a sensor device of such a mass flow controller suitable for stably sensing gas flowrate of the mass flow controller regardless of variation of peripheral temperature.

2. Description of the Prior Art

With reference to FIG. 1, a known mass flow controller (Hereinafter, referred to simply as "MFC"), a kind of device for controlling gas flowrate of a manufacturing system, such as a semiconductor manufacturing system, generally comprises a main body 1 which is provided with inlet fittings 2 and outlet fittings 3 at its opposite ends. To a position of the main body 1 near the inlet fittings 2, a sensor device 4 is mounted for sensing inlet gas flowrate, whilst to a position near the outlet fittings 3, a gas flowrate control valve 5 is mounted. The MFC further includes a circuit board 6 for supplying the sensor device 4 with electric power supplied through a connector 7, or an output terminal.

Turning to FIG. 2, there is shown a detailed construction of the known sensor device 4. As depicted in this drawing, the sensor device 4 has a case 12 covered with a heat insulation plate 11. A sensor tube 13 is provided inside the case 12 such that its inlet and outlet 13a and 13b are protruded from a side of the case 12, respectively. In order to fix the position of the sensor tube 13 in the case 12, the inlet 13a and the outlet 13b of the tube 13 are brought into engagement with individual O-rings 16 and 16' at the outer surface of the case 12. The sensor device 4 further includes an up-stream coil 14 and a down-stream coil 15 which coil around the sensor tube 13 and sense quantity of heat of the gas passing through the tube 13, respectively.

In the gas flowrate sensing operation of the aforementioned sensor device 4 of the MFC, about 5 cc (this amount may be changed in accordance with styles of the MFC) of inlet gas, which is received by the inlet fitting 2 of the main body 1, is introduced to the inlet 13a of the tube 13 and flows through the tube 13 in a direction from the up-stream coil 14 to the down-stream coil 15.

At this time, the gas in the sensor tube 13 flows at a velocity which is generally proportional to the gas flowrate in the main body 1 of the MFC. Otherwise stated, the current velocity of the gas 4 in the sensor tube 13 is increased when the gas flowrate in the main body 1 is increased, on the contrary, the velocity is reduced when the gas flowrate in the main body 1 is decreased. In addition, it has been noted that all kinds of gases have individual specific heats which are different from each other in accordance with their flowrates and kinds. The heat of a gas is proportional to the current velocity of that gas.

In accordance with the aforementioned theory in the gas flowing, it is well known to those skilled in the art that the temperature difference ($\delta T = T_1 - T_2$) between the heat $T_1$ sensed by the up-stream coil 14 of the sensor tube 13 and the, temperature $T_2$ sensed by the down-stream coil 15 is direct proportional to the current velocity difference of the gas between the up-stream coil 14 and the down-stream coil 15.

The minor temperature difference $\delta T$ between the up-stream coil 14 and the down-stream coil 15 is converted into a voltage value corresponding to that temperature difference $\delta T$. This voltage value is employed in calculation of the current velocity difference of the gas which passes through the sensor tube 13 and, as a result, it is possible to calculate the total gas flowrate per unit time received by the main body 1 of the MFC.

Meanwhile, the sensor device 4 is easily affected by variation of peripheral conditions, such as peripheral temperature and pressure. Particularly, remarkable variation of the peripheral temperature causes the minor temperature difference $\delta T$ sensed by the sensor device 4 to result in incorrect determination of the total gas flowrate of the main body 1. Hence, such a remarkable variation of the peripheral temperature makes the temperature difference sensed by the sensor device 4 be of no use. If described in detail, since most of the commercialized MFCs, which are calibrated to be used at a temperature of 0° C. and a pressure of 760 Torr., are generally used at different temperatures and different pressures, the practical accuracy of the sensor device 4 of the MFC occasionally reduced to about 5–25% of ideal accuracy and causes incorrect calculation of total gas flowrate of the MFC.

In an effort to overcome the above problem, there has been proposed several techniques, such as installation of overlapped thermal insulation plates about the case 12 and addition of an external case 12 to the sensor device 4. However, these known techniques have a problem in that they only provide limited efficiency, and furthermore, can not provide said limited efficiency when they are employed in a small sized sensor device.

SUMMARY OF THE INVENTION

It is, therefore, an object of the present invention to provide a sensor device for a mass flow controller which stably senses the gas flowrate of the mass flow controller regardless of variation of peripheral condition, particularly variation of temperature, by adding temperature stabilizing means employing Peltier effect to the sensor device of the mass flow controller.

In accordance with an embodiment of the present invention, the above object can be accomplished by providing a sensor device comprising a case being covered with a heat insulation plate, a sensor tube being arranged in the case to pass therethrough, an up-stream coil and a down-stream coil coiling around the sensor tube and being adapted for sensing heat of a gas passing through the sensor tube, respectively, a thermoelectric converter for converting a heat difference of the gas in the sensor tube into a voltage, an amplifier for amplifying the voltage output from the thermoelectric converter, a linearizer for linearizing the amplified voltage of the amplifier, a refrigeratory plate being arranged in the case for maintaining the inside temperature of the sensor device at a predetermined temperature, a pair of Peltier thermoelectric wires comprising an antimony wire and a bismuth wire being connected to a drive power supply terminal and a ground terminal of an electric power connector, respectively, and a thermostat for selectively cutting off power supply to the refrigeratory plate when the inside temperature of the sensor device is lower or higher than a predetermined critical temperature.

BRIEF DESCRIPTION OF THE DRAWINGS

The above and other objects, features and other advantages of the present invention will be more clearly understood from the following detailed description taken in conjunction with the accompanying drawings, in which:

FIGS. 1 and 2 show a construction of a known mass flow controller, respectively, in which:

FIG. 1 shows the construction of the known mass flow controller; and

FIG. 2 shows a sensor device of the mass flow controller of FIG. 1; and

DESCRIPTION OF THE PREFERRED EMBODIMENTS

Figure 1:
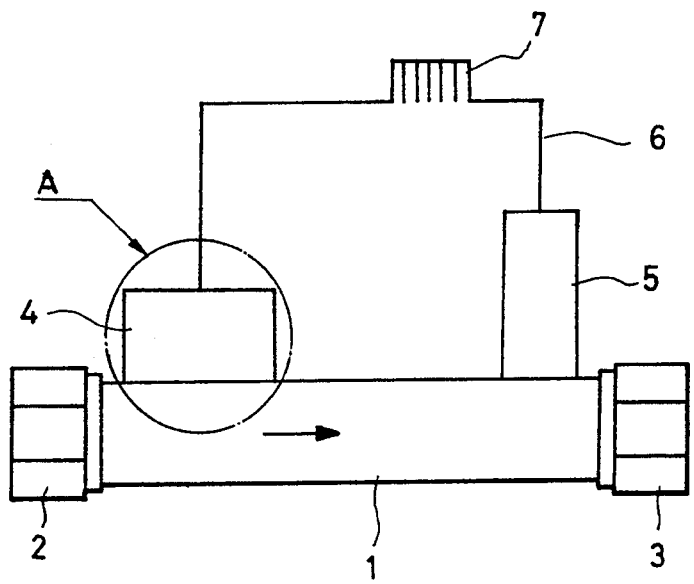
Figure 2:
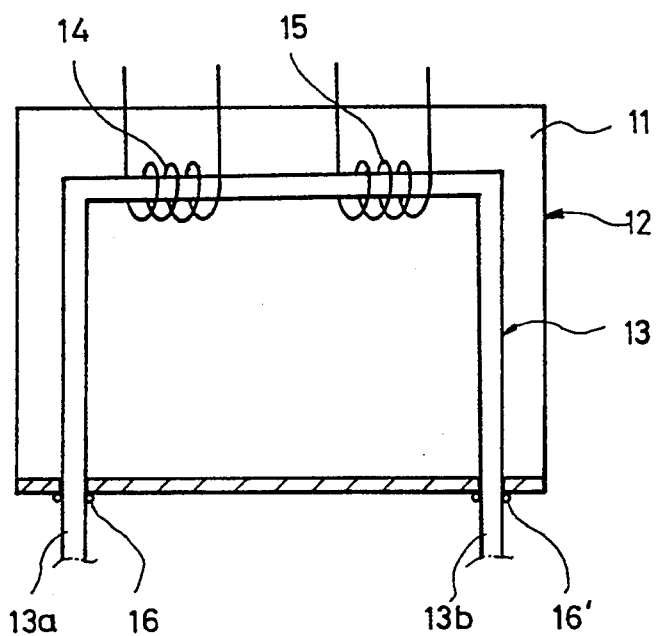

In the sensor device of this invention, several elements are common with those of the aforementioned known sensor device. Those elements common to both the prior art and this invention will thus carry the same reference numerals.

Figure 3:
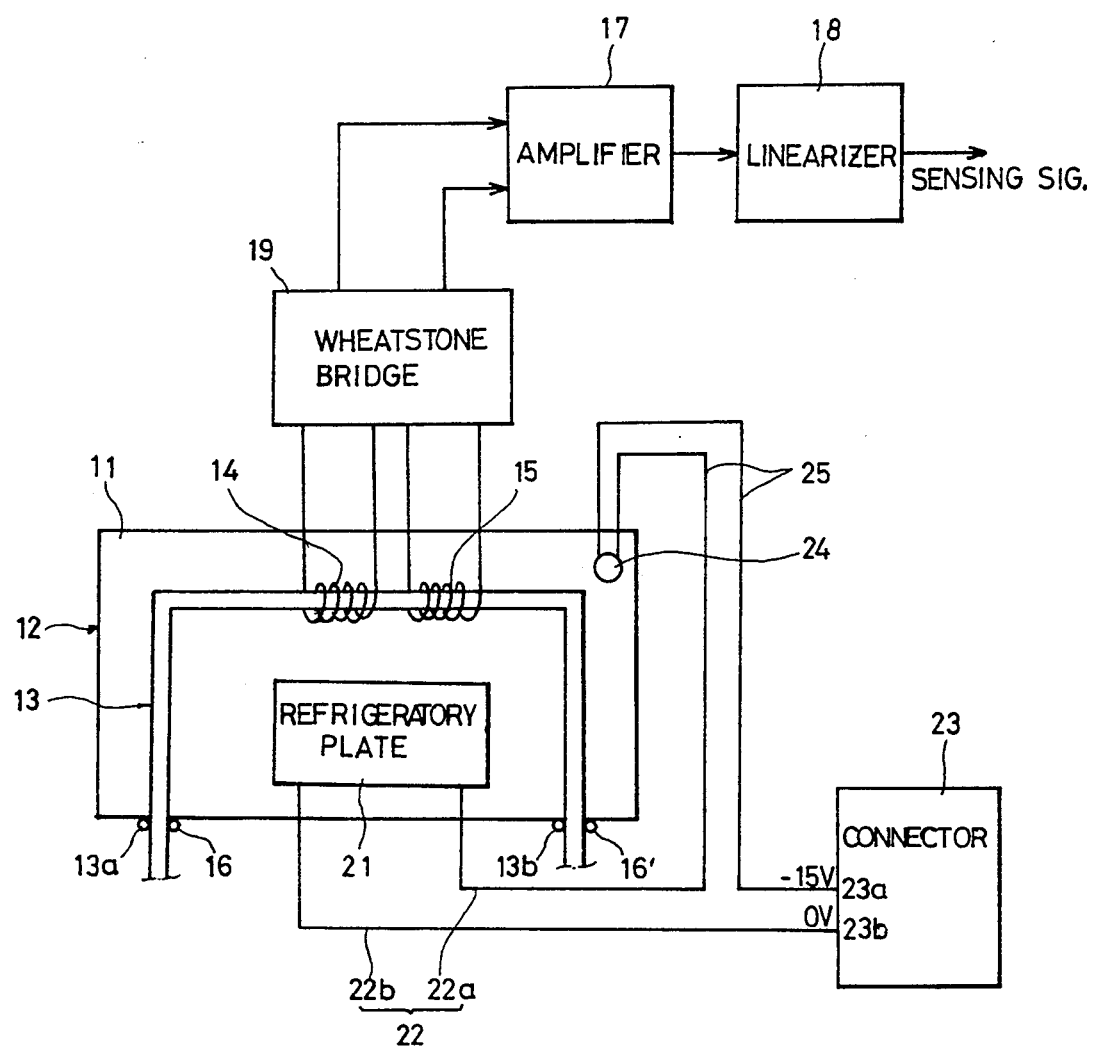
FIG. 3 is a block diagram of a sensor device of a mass flow controller having temperature stabilizing means of the present invention.

With reference to FIG. 3, there is shown a sensor device of a mass flow controller (MFC) having temperature stabilizing means according to this invention. As depicted in this drawing, the sensor device 4 of the invention includes a case 12 covered with a thermal insulation plate 11. A sensor tube 13 is provided in the case 12 such that its inlet and outlet 13a and 13b are protruded from the case 12, respectively. The sensor device 4 further includes an up-stream coil 14 and a down-stream coil 15 which coil around the sensor tube 13 to be spaced apart from each other and sense temperature $T_1$ and $T_2$ of the gas passing through the tube 13, respectively.

The above coils 14 and 15 are connected to a thermoelectric converter 19, such as a wheatstone bridge, for converting the temperature difference $\delta T$ between the temperature $T_1$ sensed by the up-stream coil 14 and the temperature $T_2$ sensed by the down-stream coil 15 into voltage. In order to amplify the voltage output from the thermoelectric converter 19, the output ports of the converter 19 is connected to an amplifier 17 which is in turn connected to a linearizer 18 for linearizing the amplified voltage of the amplifier 17 into 0–5 V DC. The sensor device 4 further includes temperature stabilizing means. Hereinbelow, this temperature stabilizing means will be described in detail. This means comprises a refrigeratory plate 21 which is arranged in the case 12 so as to maintain the inside temperature of the sensor device 4 at a predetermined temperature. The refrigeratory plate 21 is connected to an electric power connector 23 through a pair of Peltier thermoelectric wires 22. These peltier thermoelectric wires 22 are applied with electric power from the connector 23. In order to cause the refrigeratory plate 21 to be maintained at a cooled state of a specified temperature, a thermostat 24 is provided in the case 12. This thermostat 24 intends to selectively cut off power supply to the refrigeratory plate 21 when the inside temperature of the sensor device 4 is lower or higher than a predetermined critical point.

The Peltier thermoelectric wires 22 comprise an antimony wire 22a, which is connected to a −15 V DC terminal 23a of the connector 23, and a bismuth wire 22b which is connected to a ground terminal 23b of the connector 23.

The thermostat 24 is connected to the antimony wire 22a of the thermoelectric wires 22 through connection wires 25.

Hereinbelow, the operational effect of the above sensor device 4 will be described in detail in conjunction with FIG. 3.

Upon powering on a semi conductor manufacturing system equipped with the above sensor device 4 of the MFC, the MFC is warmed up. As a result of warming up of the MFC, the connector 23 outputs electric power from its −15 V DC terminal 23a and its ground terminal 23b to the refrigeratory plate 21 through the antimony wire 22a and the bismuth wire 22b, respectively. During the power supply to the refrigeratory plate 21, the Peltier effect is induced to the Peltier thermoelectric wires 22 of the sensor device 4 and this causes the inside temperature of the case 12 to be always maintained at a predetermined temperature of about 10° C. regardless of peripheral condition. Here, as noted to those skilled in the art, the Peltier effect means that a wire resulting from connection of different metal wires receives or generates heat when it is applied with electric power at both ends thereof. When the inside temperature of the sensor device 4 drops to be lower than the predetermined critical point as a result of continued reception of heat of the refrigeratory plate 21 caused by continued power supply to the plate 21, the thermostat 24 disconnects the refrigeratory plate 21 from the connector 23 and cuts off power supply from the connector 23 to the refrigeratory plate 21. On the contrary, when the inside temperature of the sensor device 4 rises to exceed the predetermined critical point as a result of continued stop of the refrigeratory plate 21 caused by continued power off, the thermostat 24 connects the refrigeratory plate 21 to the connector 23 and causes power supply from the connector 23 to the refrigeratory plate 21.

In accordance, the sensor device 4 senses the temperature difference $\delta T$ of the gas passing through the sensor tube 13 regardless of peripheral temperature variation. The sensed temperature difference $\delta T$ is, thereafter, used for calculation of flowrate per unit time of the gas in the main body 1 of the MFC. The gas passing through the main body 1 of the MFC is controlled in its flowrate on the basis of the calculated flowrate per unit time.

As described above, the present invention provides a sensor device of the mass flow controller which is provided with temperature stabilizing means comprising refrigerating means and a thermostat, both being adapted for maintaining the inside temperature of the sensor device at a predetermined critical point. Therefore, the sensor device of this invention accurately senses gas flowrate of a main body of the mass flow controller regardless of peripheral temperature variation. In this respect, this sensor device is suitable for a high level and precise semiconductor manufacturing system.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A sensor device for a mass flow controller comprising:
   a case covered with a heat insulation plate;

a sensor tube arranged n said case to pass through said case;

an up-stream coil and a down-stream coil coiling around said sensor tube and adapted for sensing heat of a gas passing through said sensor tube, respectively;

a thermoelectric converter for converting temperature difference between the heat sensed by said up-stream coil and the heat sensed by said down-stream coil into a voltage;

an amplifier for amplifying the voltage output from said thermoelectric converter;

a linearizer for linearizing the amplified voltage of said amplifier;

refrigerating means arranged inside said case for maintaining the inside temperature of said sensor device at a predetermined temperature; and a thermostat arranged inside said case for selectively cutting off power supply to said refrigerating means when the inside temperature of said sensor device is lower or higher than a predetermined critical temperature;

wherein said refrigerating means comprises:
    a refrigeratory plate being arranged in said case; and
    a pair of Peltier thermoelectric wires for connecting said refrigeratory plate to an electric power connector, and wherein said Peltier thermoelectric wires comprise:
    an antimony wire being connected to a drive power supply terminal of said electric power connector; and
    a bismuth wire being connected to a ground terminal of said power supply connector.

* * * * *